Figure 11:
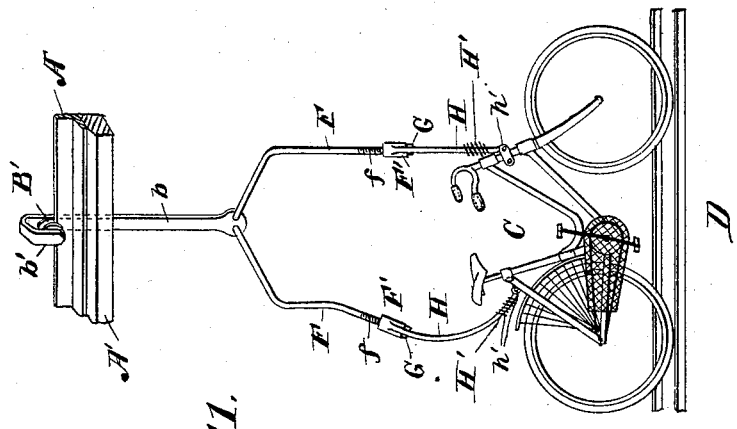

(No Model.) 3 Sheets—Sheet 1.
D. KNOWLES.
BICYCLE SUPPORT.
No. 578,490. Patented Mar. 9, 1897.
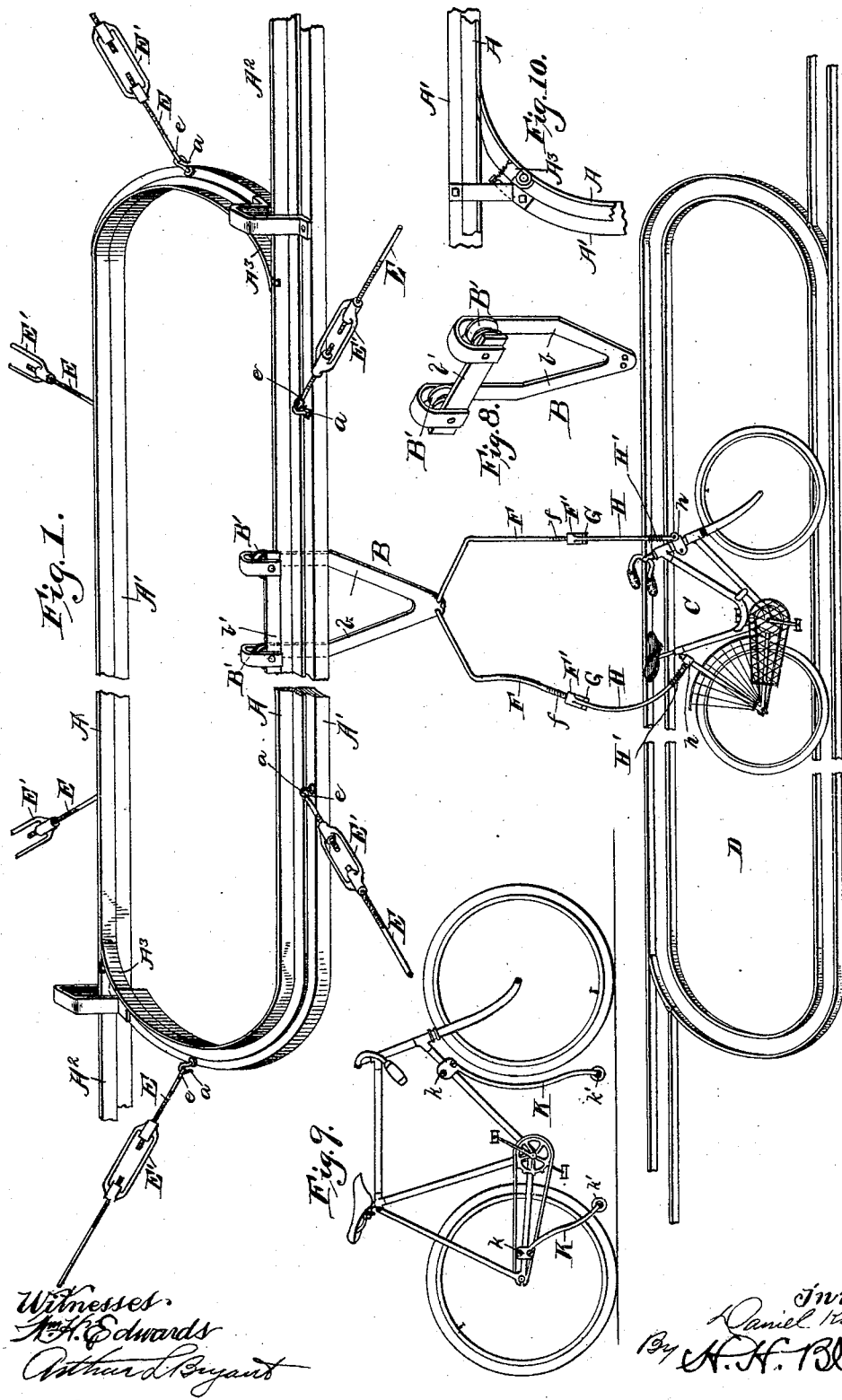
Witnesses
H. H. Edwards
Arthur L. Bryant
Inventor
Daniel Knowles
By H. H. Bliss
atty.

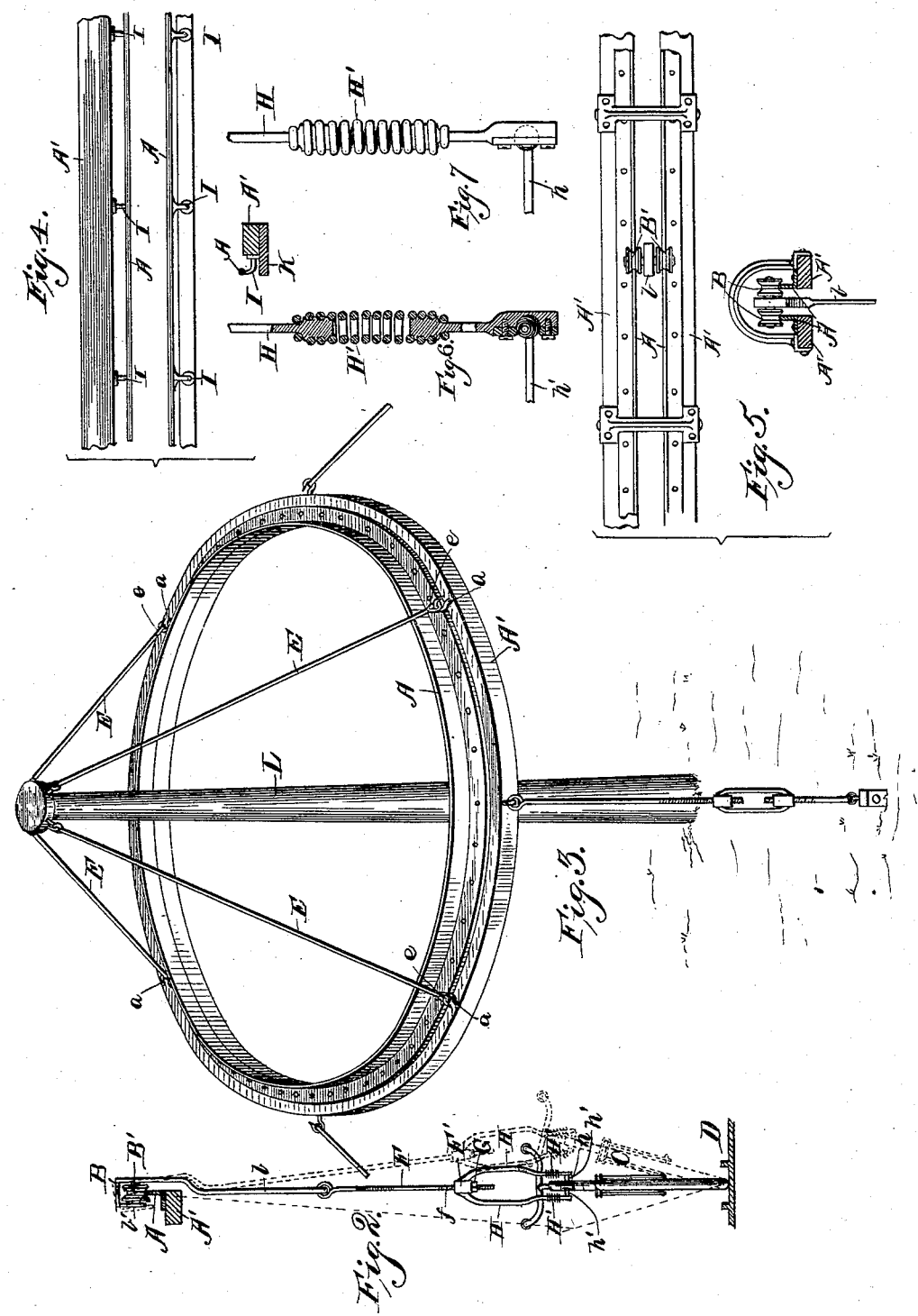

(No Model.)  3 Sheets—Sheet 3.
D. KNOWLES.
BICYCLE SUPPORT.

No. 578,490.  Patented Mar. 9, 1897.

Witnesses
Wm H. Edwards Jr.
Arthur S. Bryant

Inventor
Daniel Knowles
By J. H. H. Bliss
Atty

UNITED STATES PATENT OFFICE.

DANIEL KNOWLES, OF NORFOLK, VIRGINIA.

BICYCLE-SUPPORT.

SPECIFICATION forming part of Letters Patent No. 578,490, dated March 9, 1897.

Application filed July 3, 1896. Serial No. 598,021. (No model.)

*To all whom it may concern:*

Be it known that I, DANIEL KNOWLES, a citizen of the United States, residing at Norfolk, in the county of Norfolk and State of Virginia, have invented certain new and useful Improvements in Bicycle-Supports; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improved device for assisting beginners in learning to control and operate a bicycle.

To those devices heretofore used or proposed for this purpose with which I am acquainted difficulties and disadvantages are incident. In the earlier ones provision was made for, first, supporting the entire weight of the bicycle and of the upwardly-projecting arm or arms upon the floor or ground below the bicycle-wheels, and, secondly, the upwardly-projecting bar or bars had a rigid connection with the frame of the bicycle. In consequence of these facts but little benefit results from practicing upon or using the machine. It is held in a manner radically different from that in which it is held when in ordinary use without extra supports. It is well known that the maintaining of a bicycle in an upright position is to the beginner a peculiarly difficult matter because of the constant liability for the machine to swing or commence falling to the right or left, which swinging or falling is overcome by maintaining a requisite speed and by a proper manipulation of the steering-wheel.

If the wheel be held rigidly in upright position, the practice thereon or the use thereof is not accompanied by the necessity of mastering the primary and principal difficulty above referred to, as the rider is not subjected to the sensation of falling or swinging laterally. Again, in the earlier mechanisms for assisting in the use of and practice upon the bicycle the support for the upwardly-extending bars, rods, or equivalents was the wheel itself, and not only their weight, but their cumbersomeness, served to increase the difficulties of manipulating, managing, and propelling the wheel.

One of the objects of the present invention is to provide an attachment for this purpose which shall be adapted to be supported largely, if not entirely, independently of the bicycle; and this I accomplish by suspending it from an overhead track or guideway, in contradistinction to merely confining it in proper position horizontally, or against lateral displacement, at the upper end.

Another important object is to furnish an attachment for the machine which while holding it sufficiently to generate a feeling of confidence in the rider shall yet be adapted to permit the wheel to move in one direction or the other, as concerns lateral swaying or swinging, in a manner approximating, in character and extent, that in which a bicycle moves when being used by the practiced rider.

The invention also relates to matters of construction and arrangement which will be readily understood from the description appearing below in connection with the drawings.

Figure 1 is a perspective view showing an embodiment of my invention. Fig. 2 is a sectional view of the same. Fig. 3 is a view illustrating another manner of supporting the elevated guideway. Figs. 4 and 5 are detail views of different tracks or guideways. Figs. 6 and 7 are detail views of the spring which is interposed in the sustaining device. Fig. 8 is a detail view of the trolley-like carrier. Fig. 9 is a side view of a bicycle having an additional support applied thereto. Fig. 10 is a detail plan view of a portion of the top guide. Fig. 11 is a detail view of a slightly-different form of trolley.

In the drawings, A designates generally an elevated guideway on which is mounted a movable trolley-like device B, provided with means for attachment to the frame of any ordinary bicycle, (designated at C.)

The guideway A may be formed in either of numerous ways and suitably supported at the desired elevation above the floor or track D on which the bicycle runs.

In Fig. 1 I have illustrated an embodiment of my invention in which the guideway A is formed of angle-iron and is adapted to be supported from suitable surrounding supports, such, for example, as the walls or beams of a building. In this construction the angle-iron is rigidly fastened to suitable framing-bars A', which are connected to the inner lower ends of rods E. The rods E may be provided with eyes $e$, which engage with or take over suitable hooks $a$ on the frame, or the parts may be connected in any suitable manner. At their outer upper ends the rods E are provided with means for attachment to suitable stationary supports, such as the beams of a hall, and said means may be in the nature of hooks and rings, as described, or of any other suitable character.

Each of the rods E is preferably made in two sections connected by a suitable turnbuckle E', by means of which the length of the rods can be varied somewhat, if necessary.

On the track or guideway A there is mounted, as aforesaid, the trolley or movable carrier B. It consists of arms or bars $b\ b'$, between which are supported one or more rollers B'. The latter bear down upon and ride along the upper surface of the track or guideway.

The arm $b$ is preferably somewhat longer and extends down farther than that at $b'$, both being preferably flared somewhat in order to allow of the desired movements of the parts. I have illustrated in Fig. 11 a form of trolley in which but a single wheel B' is employed, the arms $b\ b'$ extending vertically downward.

To the longer arm $b$ of the movable support are connected the upper ends of relatively short depending arms F. There are preferably two of these arms, each being of the form shown and both being connected with the arm $b$ at a point directly under the axis of the wheel or roller B', and from which point they extend in opposite directions.

On each arm F there is fitted a sleeve F', which is supported at any desired position from the lower free end of the arm by a nut G, which engages with the thread $f$, formed on the arm at and adjacent to its said end. The sleeves F' are provided with two arms H, the lower ends of which terminate in clamps $h$, of any suitable style, adapted to be engaged with the frame of the bicycle C.

The clamps $h$ can be engaged with the frame of the bicycle in such way as that the arms H will not interfere with the movements of the rider on the machine or in mounting and dismounting therefrom.

H' H' indicate springs which are interposed at suitable places between two parts of the upward-extending attachment. As shown, the arms or legs H are formed in two parts, which are connected by one of these springs. In order that there may be the greatest possible freedom of motion between the parts, I have in Figs. 6 and 7 shown each of the studs $h'$ which extends out from each of the clamps $h$ as connected with the lower portion of the rod H by a ball-and-socket joint. In most cases, however, this will be unnecessary, as the springs H' will themselves allow the requisite amount of motion.

By means of the nut G the clamps $h$ may be adjusted vertically in order to be properly arranged for attachment to wheels of different sizes.

The guideway A may be of any suitable form and of any length desired. I have illustrated it in Fig. 1 as made in the form of an oval and connected, through any ordinary style of switch mechanism, as at $A^3$, with one or more sections of straight guideway, as at $A^2$.

As before stated, the track may be formed in numerous ways other than that shown in Figs. 1 and 2. In its simplest form it may consist of a cable of suitable size, or a pipe supported on hangers I, as indicated in Fig. 4. In this case I preferably arrange a guide-strip K below the hangers I to assist in maintaining the carrier B in proper position without interfering with the lateral flexibility of the lower part of the attachment; or in some cases it may be desired when the carrier is provided with two supporting-wheels to have the same ride on parallel guideways and have a centrally-arranged depending arm for supporting the clamp-arms. Such a form is illustrated in Fig. 5.

In case it is desired to erect the apparatus in the open air the guideway may be supported from a central pole L, which is provided at its upper end with a cap-plate to which the upper ends of the rods E can be connected.

As hereinbefore indicated, I prefer to form on the floor or surface over which the bicycle moves a track D, which extends parallel with the guideway A and serves to guide and direct the rider in his movements; but when an apparatus is used embodying other features of my improvements a bottom guide of this character is not essential, as the part can be so constructed as to permit considerable divergence of the bicycle-wheels from a central or normal line because of the frame between the bicycle and the elevated guide being so constructed and supported as to allow the vibratory movements herein described without permitting disengagement of the guide from its guideway.

It will now be seen that the parts can be constructed and related if the plan herein described be followed, so that practically the entire weight of the attachment is underhung or suspended from the track. Even without the springs H' considerable flexibility can be provided at points between the topmost support and the points of contact of the bicycle, and, as above described, the latter is left to move much in the ordinary way, and by the addition of the springs H' at any suitable place this flexibility is greatly increased. The rider soon notices that the wheel cannot sway or swing dangerously, and a resulting confidence is generated, but at the same time the wheel is liable to lateral movements to such an extent that the power to properly control the wheel is developed and a correct habit of controlling it is formed.

In Fig. 9 I have illustrated an attachment which may be applied to a bicycle as an additional safeguard when the above-described supporting devices are employed or when the suspending devices are removed. It consists in attaching two arms K to the frame of the wheel by suitable clamps k, each arm being provided at its lower end with a roller k', that normally lies from three to four inches above the floor or surface on which the bicycle is moving.

As above indicated, I am aware of the fact that bicycle-supports have been made or proposed heretofore, but they have differed in material respects from the one herein presented. One of the earlier plans has been to combine with a bicycle an elevated guide-flange and an intermediate frame stiffly supported entirely upon the bicycle and having at its upper end either two vertical rollers bearing against the vertical sides of the guide-flange or one vertical roller lying between two vertical guide-flanges. With such a mechanism lateral swaying or vibrating is not permitted because of the elongated vertical rollers binding or cramping against the stationary guide-flanges as soon as such vibration begins, and, moreover, such vibration must be prevented in order to prevent the escape of the vertical rollers from the stationary guide, which was accomplished by two ribs or flanges along the floor or ground a few inches apart and near the wheels of the bicycle.

Another plan has been to employ a substantially similar frame stiffly connected to and supported entirely upon the bicycle, and to combine therewith not only upper rollers on vertical axes, but also lower rollers closely adjacent to one of the bicycle-wheels. The result is, as above described, to hold the wheels stiffly and without the possibility of swaying or vibration.

In my case the upwardly-extending frame is throughout more or less of its length vibratable relatively to the upper guide, either by having the movable guide member adapted to bear on vertical lines against the guideway and at the same time sway horizontally relatively thereto or by having the part which is connected to the bicycle sway relatively to the moving guide member, both of which movements are more or less possible in the construction shown.

What I claim is—

1. In an apparatus for the purpose described, the combination with an elevated guideway, of a carrier movable on said guideway, and one or more clamps flexibly connected to said carrier so as to permit lateral movement and adapted to engage with the frame of a bicycle, substantially as set forth.

2. In an apparatus for the purpose described, the combination of a bottom guide for the wheels of a bicycle, an upper guide situated above the head of the rider, and an intermediate frame suspended from the upper guide to provide vertical support for and hold the bicycle in the lower guide, substantially as set forth.

3. In an apparatus for the purpose described, the combination with a bicycle having a rider's seat, a bottom guide for the wheels of the bicycle, an elevated guide, and an intermediate frame suspended from said elevated guide and attached to the bicycle both in front and in rear of the rider's seat, said suspended frame providing a vertical support for the bicycle and acting to maintain the wheels thereof in the bottom guide, substantially as set forth.

4. In an apparatus for the purpose described, the combination with a bicycle having a rider's seat, an elevated guide, and an intermediate frame having an upper portion engaging said elevated guide and a lower portion engaging the bicycle at two points longitudinally of the length thereof, said upper and lower portions of said intermediate frame being flexibly connected to permit lateral motion of the bicycle while supported vertically, substantially as set forth.

5. In an apparatus for the purpose described, the combination of an elevated guide, a bottom guide, a bicycle having its wheels fitted to the bottom guide, and an intermediate frame suspended from the upper guide and adapted to engage with and support the bicycle, said frame consisting of two sections flexibly connected together to permit lateral motion of the bicycle while its wheels are in contact with the bottom guide, substantially as set forth.

6. In a bicycle-supporting apparatus, the combination of a guideway, means for supporting the guideway in an elevated position, a carrier mounted on said guideway to move longitudinally thereon, the depending arms, F, connected to the carrier, arms, H, loosely connected to the carrier-arms, and the clamps for engaging with a bicycle-frame carried by said arms, H, substantially as set forth.

7. In a bicycle-supporting apparatus, the combination with an elevated support, a trolley-like carrier mounted on the upper edge of said support to move longitudinally thereof, a sectional depending arm connected at one end to said trolley-like carrier and provided at its other end with means for attachment to a bicycle-frame, and means for flexibly connecting the sections of said arm, substantially as set forth.

8. In a bicycle-supporting apparatus, the combination with an elevated support or guideway, an overrunning trolley-like carrier mounted on said support to move longitudinally thereof, and means depending from said carrier for supporting a bicycle, such means being adapted to yield both laterally and vertically according to the movements of the bicycle, substantially as set forth.

9. In an apparatus for the purpose described, the combination with a bicycle, of an elevated guideway, a guiding device fitted to said way, and an intermediate frame connecting the bicycle and elevated guiding device and adapted to vibrate laterally relatively to the latter, substantially as set forth.

10. In an apparatus for the purpose described, the combination with a bicycle, of an elevated guide, a guiding device bearing on vertical lines against said guide, and an intermediate frame between the bicycle and the guiding device and adapted to vibrate laterally while the guiding device is bearing vertically on the guide, substantially as set forth.

In testimony whereof I affix my signature in presence of two witnesses.

DANIEL KNOWLES.

Witnesses:
  LAURENCE WARING,
  THOMAS KIRBY.